March 17, 1953     A. C. HALTER     2,632,077
VENTING ARRANGEMENT FOR LIQUID RHEOSTATS
Filed June 23, 1951     2 SHEETS—SHEET 1

Inventor
Allan C. Halter
by Walter J. Madden, Jr.
Attorney

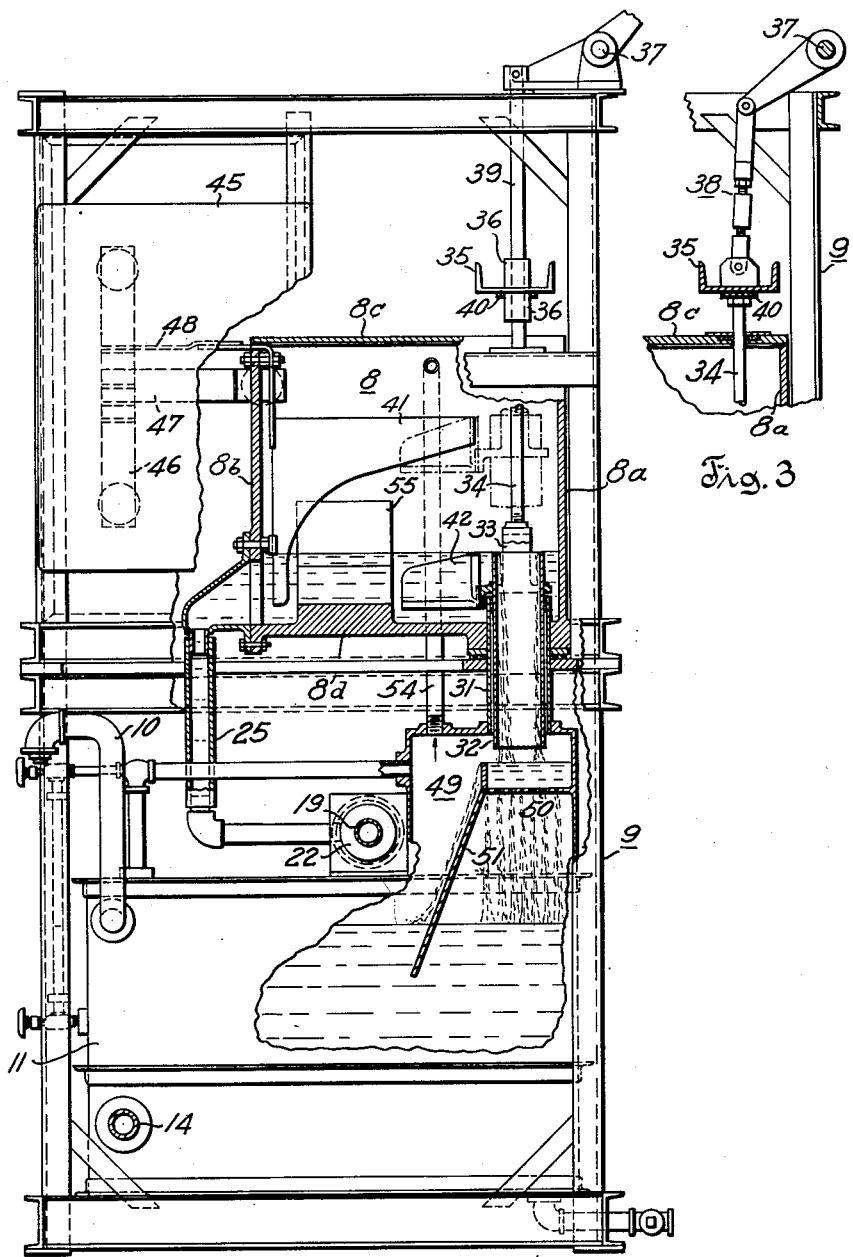

Patented Mar. 17, 1953

2,632,077

UNITED STATES PATENT OFFICE 2,632,077

VENTING ARRANGEMENT FOR LIQUID RHEOSTATS

Allan C. Halter, Milwaukee, Wis., assignor to Allis-Chalmers Manufacturing Company, Milwaukee, Wis.

Application June 23, 1951, Serial No. 233,202

3 Claims. (Cl. 201—57)

This invention relates in general to liquid rheostats and in particular to means for improving the operation of such rheostats.

In some liquid rheostats, electrolyte is pumped into a closed electrolyte-containing cell from a closed reservoir and returns to the reservoir through an opening in a pipe movable in the cell to form a weir of variable height. When the electrolyte flows from the cell through this pipe, it carries with it into the reservoir a considerable amount of entrapped air from the cell, and some provision must be made to release this entrapped air from the closed reservoir. Heretofore, it has been the practice to provide a pipe in the top of the reservoir which vented the air space of the reservoir to atmosphere to release the entrapped air. However, the use of such a pipe has the disadvantage that a considerable amount of electrolyte from the reservoir evaporates to the atmosphere through the pipe, necessitating replenishment of the electrolyte supply at frequent intervals. This disadvantage may be overcome by venting the reservoir air space to the rheostat cell so that the entrapped air is returned to the cell and substantially no electrolyte is lost by evaporation.

It is therefore an object of this invention to provide an improved liquid rheostat.

It is an additional object of this invention to provide an improved liquid rheostat through which electrolyte is circulated having means for preventing the loss of electrolyte from the rheostat by evaporation.

It is a further object of the present invention to provide a liquid rheostat having a closed cell supplied with electrolyte from a closed reservoir in which equal pressures are maintained in the cell and in the reservoir.

Objects and advantages other than those set forth above will be apparent from the following description when read in connection with the accompanying drawing, in which:

Fig. 2 is a side view, partly in section, of the liquid rheostat of Fig. 1;

Fig. 3 is a sectional view taken along line III—III of Fig. 1.

Figure 1:
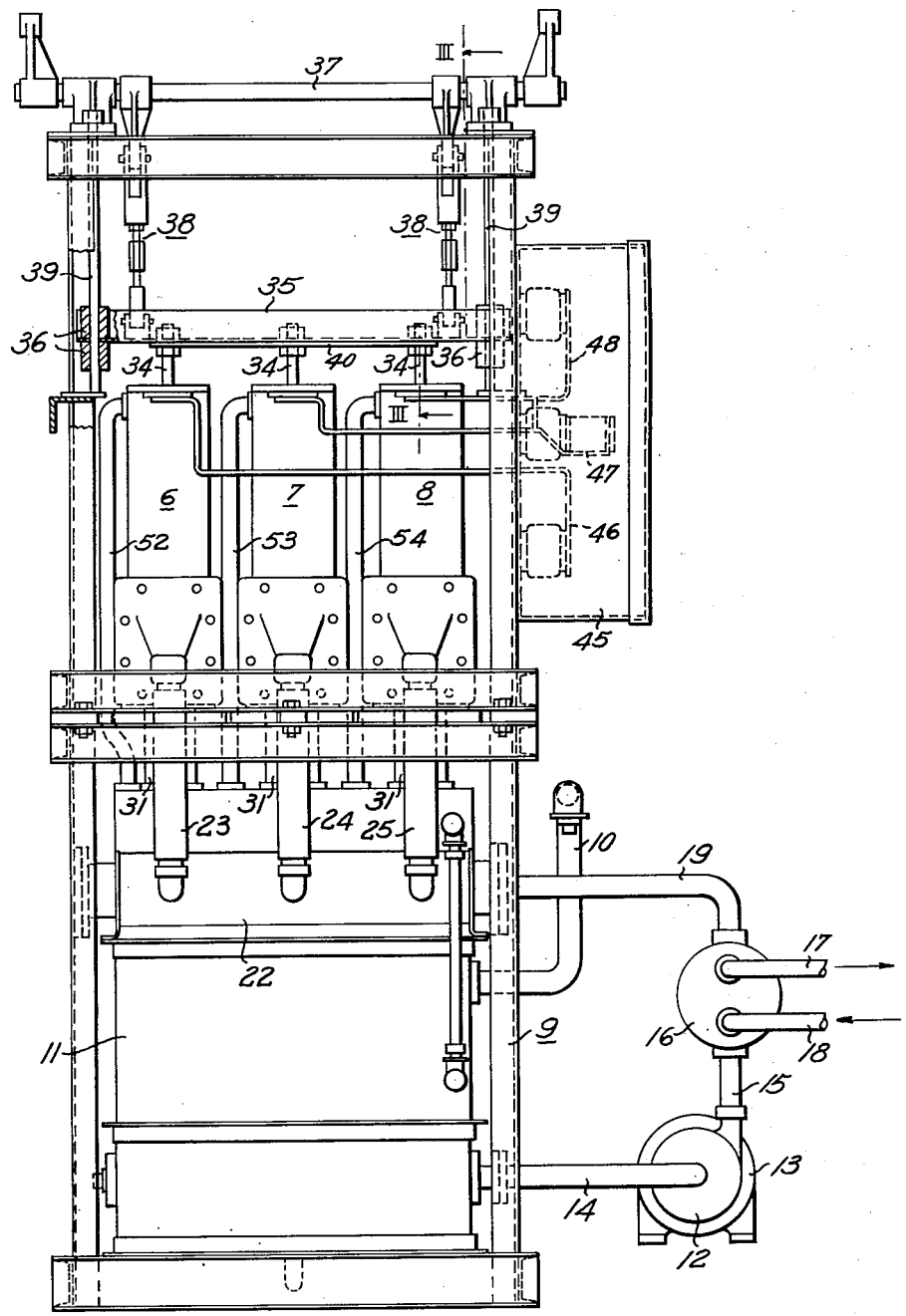
Fig. 1 is a front view of a liquid rheostat embodying the invention.

Referring to the drawing, the liquid rheostat comprises three receptacles or cells 6, 7, 8 for containing electrolyte constituting liquid resistance material between the electrode means of the rheostat. As shown in Fig. 2, a typical cell, such as cell 8, comprises a rear wall 8a, a front wall 8b, a top wall 8c, a bottom wall 8d and a pair of side walls (not shown). The walls of the cell are securely fastened together, water tight, in any suitable manner to form a closed container. The cells 6, 7, 8 are supported in any suitable manner, as on a framework 9. Electrolyte is circulated from a closed reservoir 11 through cells 6, 7, 8 by means including a pump 12 driven by any suitable means such as an electric motor 13. Reservoir 11 may be provided with a filling pipe 10 serving to replenish the supply of electrolyte in the reservoir. The filling pipe is plugged up during operation of the rheostat. The inlet of pump 12 is connected through a pipe 14 to reservoir 11 and the discharge of the pump is connected through a pipe 15 to a heat exchanger 16 having pipes 17, 18 for connection to a source of cooling liquid. From heat exchanger 16 the electrolyte flows through a pipe 19 to a header 22 having separate electrically insulating pipes 23, 24, 25 communicating with inlet openings in the front walls 6b, 7b, 8b of cells 6, 7, 8, respectively.

The bottom wall of each cell has an opening through which extends a stand pipe 31 secured in water tight relation to the bottom wall and reservoir 11. A movable pipe 32 is telescopically mounted inside pipe 31 and extends a variable distance into the cell to form a weir of variable height. The lower end of pipe 32 communicates with reservoir 11 and pipe 32 has an opening 33 in the top thereof forming a discharge opening of variable height to determine the depth of electrolyte in the cell. Pipe 32 is secured by welding or other suitable means to a metallic lift rod 34 which is in turn carried by a cross piece 35. A bar 40 of electrically conducting material is carried by piece 35 to electrically join the lift rods 34 of cells 6, 7, 8. Cross piece 35 may be raised or lowered by operation of any suitable means such as an electric motor (not shown) connected to rotate an operating shaft 37 to move cross piece 35 through an adjustable linkage 38. The movement of cross piece 35 is guided by bushings 36 engaging vertical shafts 39.

Each cell contains a plurality of electrodes, which electrodes may be fixed in position in the cell or may comprise a fixed electrode 41 and a movable electrode 42. Electrode 42 is secured to pipe 32 to be movable therewith and is so designed that the top thereof is below opening 33 in pipe 32 so that electrode 42 is always fully immersed in the electrolyte. The movable electrodes 42 are electrically connected together through lift rods 34 and conducting bar 40.

Electrodes 41 are connected to separate terminals in a terminal box 45 through conductors 46, 47, 48, respectively.

Reservoir 11 is provided with an air space 49 above the level of the electrolyte, and a splash plate 50 and a run-off plate 51 are mounted therein to break up the flow of electrolyte from pipe 32 to avoid excessive turbulence in the electrolyte in reservoir 11. Means are provided to vent air space 49 to the top of cells 6, 7, 8, and such means may comprise a common pipe joining space 49 to the cells or may comprise a plurality of vent pipes 52, 53, 54 joining air space 49 to the individual cells 6, 7, 8, respectively.

In operation, electrolyte is circulated through cells 6, 7, 8 by pump 12, and the position of each discharge opening 33 determines the depth of electrolyte in each cell and consequently the resistance between electrodes 41, 42. The solid line position of electrode 42 is the position of maximum resistance of the cell, and the dotted line position of electrode 42 represents the position of minimum resistance of the cell. An insulating block or piece 55 may be placed in each cell to increase the resistance between the electrodes when the electrodes are separated.

As the electrolyte enters discharge openings 33, it picks up air and electrolyte vapor from the cell, and this entrapped air and vapor is carried through pipe 32 into reservoir 11. The air and vapor separate from the liquid electrolyte in the reservoir and are returned to the tops of the cells through vent pipes 52, 53, 54 connecting air space 49 to the cells. Thus, the electrolyte is in a closed cycle system with no substantial loss of electrolyte through evaporation and no excess pressure produced in reservoir 11 by air trapped in air space 49.

Although but one embodiment has been illustrated and described, it will be apparent to those skilled in the art that various changes and modifications may be made therein without departing from the spirit of the invention or from the scope of the appended claims.

It is claimed and desired to secure by Letters Patent:

1. A liquid rheostat comprising a closed cell for containing electrolyte, a plurality of electrodes in said cell, a closed reservoir containing electrolyte, said reservoir having an air space above said electrolyte, means for circulating electrolyte from said reservoir through said cell, a movable pipe in said cell forming a weir of variable height, said pipe communicating with said reservoir and having an opening in the top thereof for determining the level of electrolyte in said cell to control the electrical resistance between said electrodes, and a vent pipe connecting said air space to the top of said cell to return to said cell air carried down said movable pipe by said electrolyte, said rheostat forming an airtight structure for providing a closed cycle circulation of said electrolyte and of the air confined above said electrolyte.

2. A liquid rheostat comprising a plurality of closed cells for containing electrolyte, a plurality of electrodes in each of said cells, a closed reservoir containing electrolyte, said reservoir having an air space above said electrolyte, means for circulating electrolyte from said reservoir through said cells, a movable pipe in each of said cells forming a weir of variable height, said pipes communicating with said reservoir and having openings in the tops thereof for determining the level of electrolyte in said cells to control the electrical resistance between said electrodes, and means including a vent pipe connecting said air space to the tops of said cells to return to said cells air carried down said movable pipes by said electrolyte, said rheostat forming an airtight structure for providing a closed cycle circulation of said electrolyte and of the air confined above said electrolyte.

3. A liquid rheostat comprising a plurality of closed cells for containing electrolyte, a fixed electrode and a movable electrode in each of said cells, a closed reservoir containing electrolyte, said reservoir having an air space above said electrolyte, means for circulating electrolyte from said reservoir through said cells, a movable pipe in each of said cells forming a weir of variable height, said pipes communicating with said reservoir and having openings in the tops thereof for determining the level of electrolyte in said cells, means securing each of said movable electrodes to one of said pipes, means for moving said pipes and said movable electrodes to vary the electrical resistance between said electrodes in each of said cells, and a plurality of vent pipes connecting said air space to the tops of said cells to return to said cells air carried down said movable pipes by said electrolyte, said rheostat forming an airtight structure for providing a closed cycle circulation of said electrolyte and of the air confined above said electrolyte.

ALLAN C. HALTER.

REFERENCES CITED

The following references are of record in the file of this patent:

UNITED STATES PATENTS

| Number | Name | Date |
| --- | --- | --- |
| 1,321,483 | Simmon | Nov. 11, 1919 |
| 1,321,522 | Hall | Nov. 11, 1919 |
| 2,447,087 | Ostrander | Aug. 17, 1948 |